(12) United States Patent
Nakayama et al.

(10) Patent No.: US 7,182,494 B2
(45) Date of Patent: Feb. 27, 2007

(54) REAR LAMP UNIT FOR VEHICLE

(75) Inventors: Masaru Nakayama, Saitama (JP); Hiroyuki Osugi, Saitama (JP); Yoji Kanaoka, Saitama (JP); Shinichi Maeda, Saitama (JP); Toru Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 10/915,328

(22) Filed: Aug. 11, 2004

(65) Prior Publication Data

US 2005/0068781 A1 Mar. 31, 2005

(30) Foreign Application Priority Data

Sep. 4, 2003 (JP) ............... 2003-312915

(51) Int. Cl.
*F21S 8/10* (2006.01)
(52) U.S. Cl. ...................... 362/545; 362/521
(58) Field of Classification Search ........... 362/545, 362/521
See application file for complete search history.

(56) References Cited

U.S. PATENT DOCUMENTS 5,081,564 A * 1/1992 Mizoguchi et al. ......... 362/521
5,490,049 A * 2/1996 Montalan et al. ........... 362/545
6,045,246 A * 4/2000 Goto ........................... 362/521
6,099,156 A 8/2000 Jenkins et al.

FOREIGN PATENT DOCUMENTS

| JP | 6-243703 A | 9/1994 |
|---|---|---|
| JP | 2000-123610 A | 4/2000 |
| JP | 2000-251508 A | 9/2000 |
| JP | 2002-25310 A | 1/2002 |
| JP | 2003-54460 A | 2/2003 |

* cited by examiner

*Primary Examiner*—Ali Alavi
*Assistant Examiner*—William J. Carter
(74) *Attorney, Agent, or Firm*—Birch, Stewart, Kolasch & Birch, LLP

(57) ABSTRACT

To provide a rear lamp unit for a vehicle which is provided with a desired cut pattern on an outer lens so that the light-emitting area can be increased. A rear lamp unit is provided with upper and lower outer lenses for guiding light emitted from light-emitting diodes to the outside the vehicle. The upper and lower inner lenses are provided between the light-emitting diodes and the upper and lower outer lenses, respectively, and the upper and lower inner lenses are disposed at locations apart from the upper and lower outer lenses, respectively.

17 Claims, 8 Drawing Sheets

REAR LAMP UNIT FOR VEHICLE

CROSS-REFERENCE TO RELATED APPLICATIONS

The present application is related to Japanese Patent Application No. 2003-312915 filed on Sep. 4, 2003 the entire contents of which are hereby incorporated by reference.

BACKGROUND OF THE INVENTION

1. Field of the Invention

The present invention relates to a rear lamp unit for a vehicle such as a motorcycle.

2. Description of Background Art

A rear lamp unit for a vehicle such as a motorcycle includes a tail lamp which is illuminated for identifying the presence of the vehicle to the rear, and a brake lamp which is illuminated for notifying that the vehicle is in a braking action, and so on. In the rear lamp units, a plurality of light-emitting diodes (so-called LED) are used as a light source. For example, see JP-A-2003-54460. In such a rear lamp unit, a flexibility in the design of the rear lamp unit and the rear portion of the vehicle body is such that the shape of the lens which is large in ratio can be set easily. This design is employed in many vehicles in recent years.

Since the illumination of the light-emitting diode has high directivity, there is a case where an outer lens is disposed in the illuminating direction thereof which is formed with a predetermined cut pattern to diffuse light. Thus, a widening of the light-emitting area results.

However, the cut pattern formed on the outer lens is located close to the outer surface of the vehicle so that it can be seen easily from the outside. Thus, the pattern may affect the appearance of the vehicle. Therefore, a rear lamp unit which can be provided with the cut pattern in relation to the appearance of the vehicle and can secure a predetermined light-emitting area is needed.

SUMMARY AND OBJECTS OF THE INVENTION

Accordingly, the present invention provides a rear lamp unit for a vehicle which can be provided with a desired cut pattern on the outer lens and, simultaneously, can increase the light-emitting area.

As a means for solving the problems described above, the present invention provides a rear lamp unit 50 for a vehicle including upper and lower outer lenses 51a, 51b for guiding light emitted from a light-emitting diode 55 to the outside of the vehicle. Upper and lower inner lenses 71a, 71b are provided between the aforementioned light-emitting diode and the outer lens. The inner lens is provided at a location apart from the aforementioned outer lens.

The present invention provides a rear lamp unit 50 for a vehicle which is illuminated by light emitted from the light-emitting diode 55 wherein the upper and lower inner lenses 71a, 71b and the upper and lower outer lenses 51a, 51b are disposed in the direction of illumination of the aforementioned light-emitting diode.

In this arrangement, light (illumination) emitted from the light-emitting diode is passed through the inner lens and then guided to the outside of the vehicle via the outer lens. In this case, illumination from the light-emitting diode is bent and diffused by the cut pattern on the inner lens and then bent and diffused by the cut pattern on the outer lens.

Therefore, even when the cut pattern on the outer lens is aligned in substantially one direction in relation to the appearance of the vehicle, the illumination from the light-emitting diode can be diffused over a wide range evenly as long as the cut pattern which can compensate light distribution generated by the cut pattern on the outer lens is formed on the inner lens. Thus, the light-emitting area of the rear light unit itself may be widened. In addition, when the inner lens is disposed at a location apart from the outer lens, the inner lens can hardly be seen from the outside.

The present invention provides the aforementioned outer lens that is formed with a lens extending in substantially one direction, for example, a flute cut lens 73 and the aforementioned inner lens is formed with a lens extending in the direction substantially orthogonal to the lens of the aforementioned outer lens, for example, a perpendicular flute cut lens 75.

As an example, in the present invention a unit in which the lens of the aforementioned outer lens extends substantially in the horizontal direction, and the lens of the aforementioned inner lens extends substantially in the perpendicular direction is also conceivable.

In this arrangement, illumination from the light-emitting diode is bent and diffused by the lens of the inner lens, for example, substantially in the horizontal direction, and then bent and diffused by the lens of the outer lens substantially in the vertical direction. Therefore, illumination from the light-emitting diode can be diffused over a wide range without being biased. In addition, the outer lens can be provided with a desired cut pattern in relation to the appearance of the vehicle and, simultaneously, can increase the light-emitting area of the rear lamp unit itself.

The present invention provides a plurality of the aforementioned light-emitting diodes that are arranged substantially in the horizontal direction. The aforementioned inner lens is provided between the light-emitting diodes disposed at least on both outer sides out of the plurality of light-emitting diodes and the outer lens.

In this arrangement, the light-emitting area at least at the both side portions of the outer lens can be increased. More specifically, even when the outer lens is formed into a bent shape according to the shape of the vehicle body, light emission of the rear lamp unit itself can easily be recognized when viewing the vehicle obliquely from behind. Also, in comparison with the case in which the inner lens is provided between all the light-emitting diodes and the outer lens, downsizing of the inner lens or reduction of the number of components is achieved.

The present invention provides an outer lens that is a colored transparent member. The inner lens is a colorless transparent member. The aforementioned inner lens is disposed in the vicinity of the aforementioned light-emitting diodes.

In this arrangement, in comparison with the case in which the outer lens is a colorless transparent member, the inner lens can hardly be seen from the outside. Also, since the inner lens is a colorless transparent member, lowering of the amount of light illuminated from the light-emitting diodes is prevented. In addition, since the inner lens is disposed in the vicinity of the light-emitting diode, it is disposed at a location apart from the outer lens, and the inner lens can further hardly be seen from the outside.

According to the present invention, since the inner lens is provided between the light-emitting diode and the outer lens, the outer lens may be formed with a cut pattern which is suitable to the appearance of the vehicle and simultaneously the light-emitting area of the rear lamp unit itself may be increased. Thus, the visibility of the tail lamp, the brake lamp, and so on may be improved and the flexibility in the modeling of the rear lamp unit itself and in the design of the vehicle body therearound may be improved.

Also, as in the present invention, since the inner lens is provided at a location apart from the outer lens, the inner lens can hardly be seen from the outside. Thus, a good appearance of the vehicle can be maintained.

Furthermore, as in the present invention, when the outer lens is a colored transparent member, the inner lens can hardly be seen from the outside, and the good appearance of the vehicle can be maintained. In addition, when the inner lens is a colorless transparent member, a lowering of the light amount illuminated from the light-emitting diode is prevented to maintain a good visibility of the tail lamp, the brake lamp, and so on.

According to the present invention, since the inner lens is provided between the light-emitting diode located at least on both outer sides out of the plurality of light-emitting diodes and the outer lens, light emission from the rear lamp unit itself can easily be recognized even when viewing the vehicle obliquely from behind. Also, by downsizing the inner lens or reducing the number of components, a weight reduction and a cost reduction of the rear lamp unit itself are achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
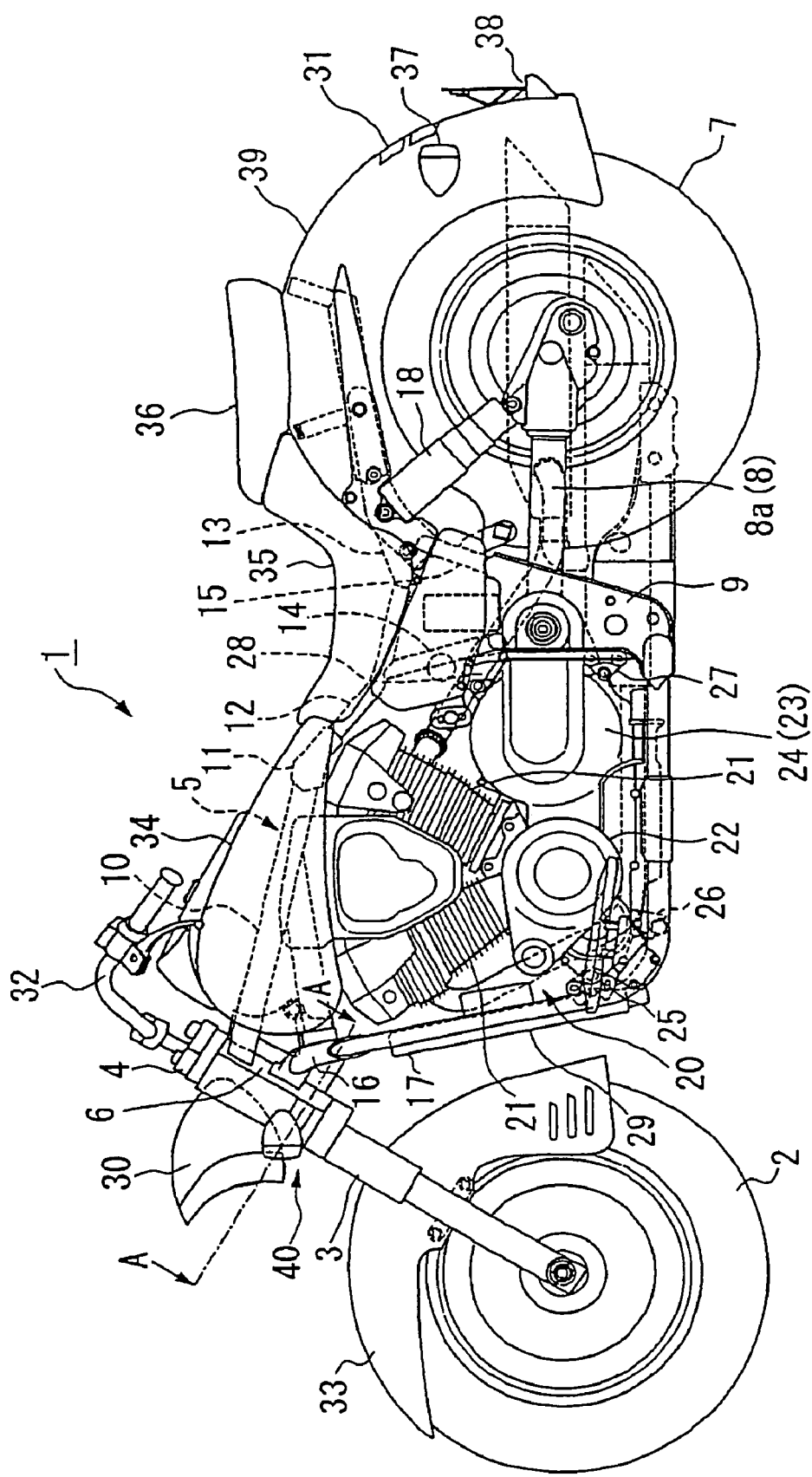
FIG. 1 is a side view of a motorcycle according to an embodiment of the invention viewed from the left side.

Referring now to the drawings, an embodiment of the present invention will be described. Indication of directions such as front, rear, left, and right in description below is the same as the direction based on the direction of the vehicle, and an arrow RR in the drawing indicates the rear of the vehicle.

As shown in FIG. 1, the left and right pair of front forks 3 rotatably support a front wheel 2 of a motorcycle 1 and are steerably supported by a head pipe 6 of a vehicle body frame 5 via a steering stem 4 at the upper end thereof. Rear swing arm portions 8 for rotatably supporting a rear wheel 7 are swingably supported by pivot plates 9 provided at the rear portion of the vehicle body frame 5 at the front ends thereof.

The vehicle body frame 5 includes a main pipe 10 extending from the upper portion of the head pipe 6 rearwardly. An upper pipe joint 11 is joined to the rear portion of the main pipe 10. A pair of left and right center upper pipes 12 branch towards the left and right from the upper pipe joint 11 and extend rearwardly therefrom. A pair of left and right rear brackets 13 are connected to the rear portions of the respective center upper pipes 12, respectively, with center pipes 14 extending from the respective center upper pipes 12 downwardly and rear pipes 15 extending from the respective rear brackets 13 downwardly being connected to the front side and the rear side of the upper portion of the pivot plates 9, respectively. A gusset 16 is joined to the lower portion of the head pipe 6. The rear ends of a pair of left and right down pipes 17 branch towards the left and right from the gusset 16, extend downwardly and then are bent, and extend rearwardly and are connected to the lower front side of the pivot plates 9. Rear shock absorbers 18 are provided between the rear brackets 13 and the rear swing arm portions 8.

An engine 20 is mounted to the portion surrounded by the center upper pipes 12, the down pipes 17, and the pivot plates 9 and the like. The engine 20 is a V-type two-cylinder engine having two cylinder portions 21 disposed into substantially a V-shape in side view. A transmission case 24 for storing a transmission 23 is connected to the rear portion of a crankcase 22 disposed below the respective cylinder portions 21. The engine 20 and the transmission 23 are supported by the vehicle body frame 5 by the front end and the lower end of the crankcase 22 connected to the down pipe 17 via brackets 25, 26 and the upper and lower rear ends of the transmission case 24 connected to the pivot plates 9 via brackets 27, 28. A radiator 29 to be supported by the down pipes 17 is disposed forwardly of the engine 20. The rear swing arms 8 have a pair of left and right fork portions 8a extending rearwardly from the front ends thereof, and a drive shaft, not shown, is inserted into one (left one in this embodiment) of the fork portions 8a. A drive force of the engine 20 is transmitted to the rear wheel 7 via the drive shaft.

Provided at the portions of the front forks 3 closer to the upper ends is a head light 30, and a pair of left and right front winkers 31 are provided downwardly thereof. The front forks 3 are provided with a steering handle 32 attached to the upper ends thereof. A front fender 33 is provided for covering the upper side of the front wheel at the lower portions of the front forks 3.

A tear-drop type fuel tank 34 is disposed on the upper portion of the vehicle body frame 5. A main seat 35 for a rider is disposed behind the fuel tank 34. The front portion of the main seat 35 is placed on the vehicle body frame 5 and the rear portion thereof is placed on a rear fender 40.

The rear fender 40 is formed of a thin steel plate, and is supported by the vehicle body frame 5 in a state of being fixed mainly to the rear bracket 13. A pillion seat 36 for a rear fellow passenger continuing from the rear end of the main seat 35 is disposed on the rear fender 40. A pair of left and right rear winkers 37 are provided on both sides of the rear portion of the rear fender 40, and a rear lamp device 50 according to the present invention is provided on the rear face at the rear portion of the rear fender 40. A license holder 38 having a license plate mounting portion and a license lamp is provided below the rear lamp unit 50.

Here, the rear lamp unit 50 serves as a tail lamp for notifying the presence of the vehicle, to which it is mounted, to the rear. A brake lamp is provided for notifying that the vehicle is in braking action to the rear and differentiates between the aforementioned tail lamp and the brake lamp by changing the brightness of the light-emitting surface thereof.

The rear fender 40 is formed into a U-shape in cross section for covering the outer peripheral side and both sides of the rear wheel 7 and is a member of an arcuate shape extending substantially along the outer periphery of the rear wheel 7. Here, the portion extending substantially along the outer peripheral surface of the rear wheel 7 at intervals as needed and being an arcuate shape in cross section defines an outer peripheral wall 41 and the portions formed substantially into a fan-shape extending from both the left and right edges of the outer peripheral wall 41 towards the center axis of the rear wheel 7 define side walls 42, respectively.

Figure 2:
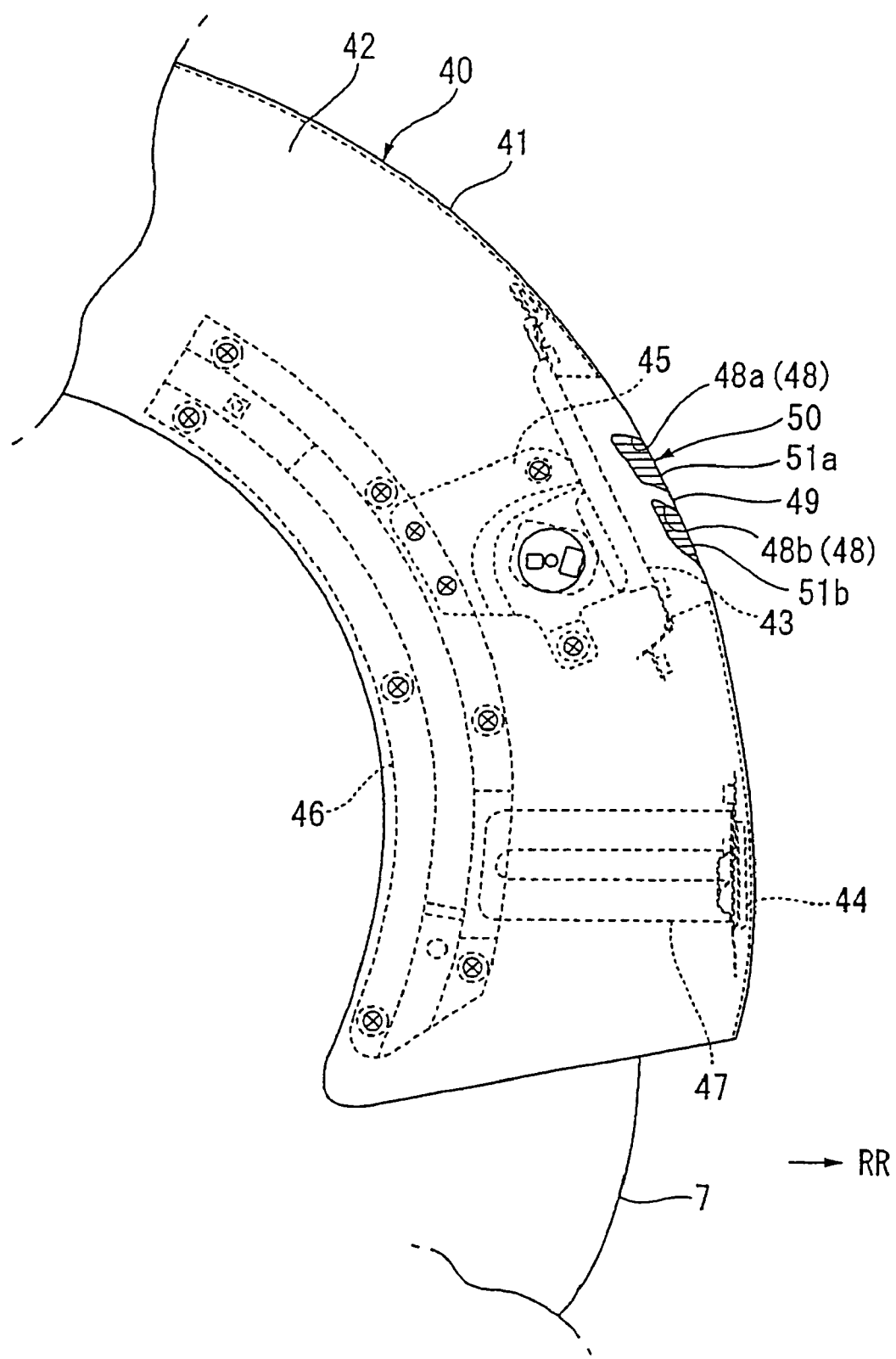
FIG. 2 is a side view of a rear fender of the motorcycle when viewed from the left side.
Figure 3:
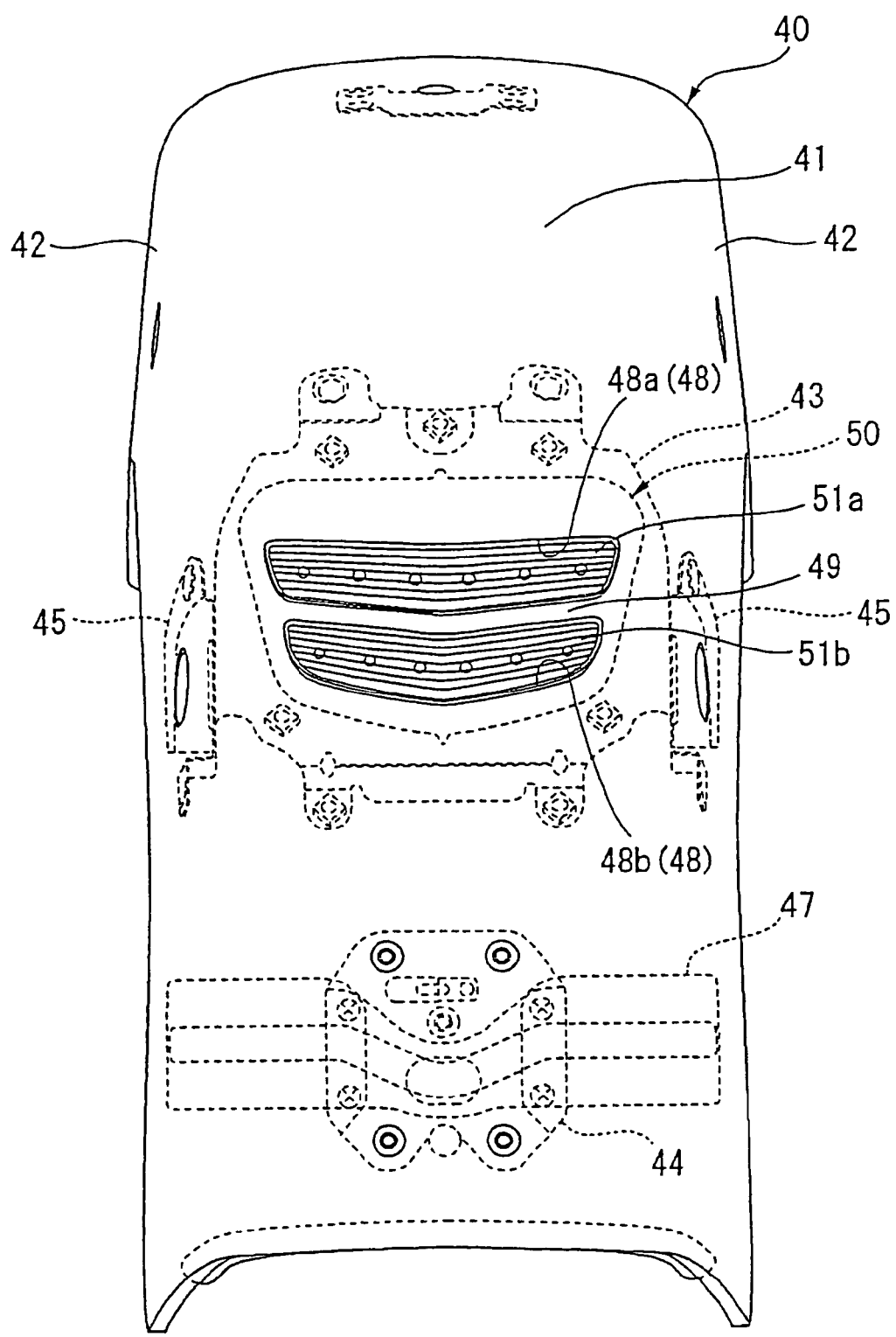
FIG. 3 is a back view of the rear fender.

As shown in FIG. 2 and FIG. 3, a tail lamp bracket 43 and a license bracket 44 for mounting the rear lamp unit 50 and the license holder 38 are provided, respectively, at the rear portion of the rear fender 40 inside the outer peripheral wall 41. The rear lamp bracket 43 is joined to the outer peripheral wall 41 at the joint flange provided on the upper portion thereof by spot welding. Winker brackets 45 for mounting the rear winkers 37 are joined to the insides of both side walls 42 by spot welding with the rear portions of the winker brackets 45 and both side portions of the rear lamp bracket 43 being joined by arc welding. Furthermore, arcuate-shaped reinforcing plates 46 are joined to the rear portion of the rear fender 40 inside the portion closer to the inner periphery of the both side walls 42 by spot welding with the reinforcing plates 46 and the front portion of the winker brackets 45 being joined by spot welding. On the lower side of the rear portion of the rear fender 40, a supporting stay 47 of a band shape extending substantially along the inner periphery of the rear fender 40 is provided. The supporting stay 47 connects the lower portion of the both reinforcing plate 46 and supports the license bracket 44.

The rear lamp unit 50 is mounted to the rear fender 40 from the inside thereof and is fixed to the rear lamp bracket 43 with screws or the like. A lens exposing hole 48 for exposing the outer lens of the rear lamp unit 50 is provided on the outer peripheral wall 41 at the rear portion of the rear fender 40. The lens exposing hole 48 is divided into two openings of an upper opening 48a and a lower opening 48b by a dividing beam 49 extending laterally between two side edges at substantially the center in the vertical direction. Both of the upper opening 48a and the lower opening 48b are narrow in the vertical direction and of a laterally elongated shape being substantially wide along the horizontal direction. Both of the edges of the lens exposing hole 48 are formed to be inclined so that the lateral width is decreased as it goes downward. Accordingly, the lateral width of the lower opening 48b is narrower than the upper opening 48a. In addition, the upper opening 48a and the lower opening 48b are formed substantially into a V-shape which is shallow in the vertical direction with the depth of the V-shape in the vertical direction being gradually decreasing in the range from the lower edge to the upper edge of the lens exposing hole 48.

Figure 4:
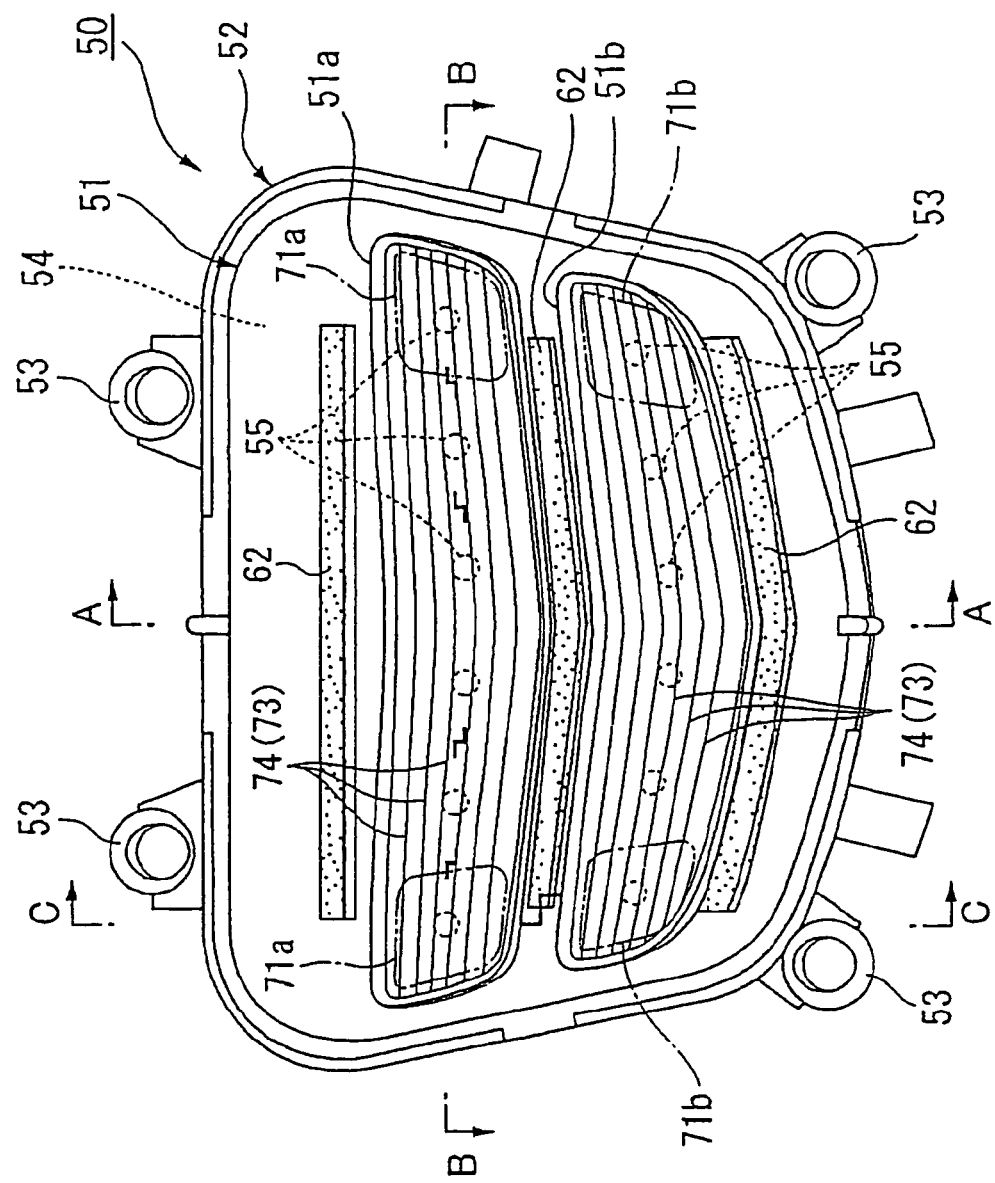
FIG. 4 is a back view of a rear lamp unit.

As shown in FIG. 4, the tail lamp unit 50 defines a lamp chamber 54 by the outer lens cover 51 and a lamp base 52 to be mounted thereto with a plurality of light-emitting diodes (so-called LED) 55 being arranged in the lamp chamber 54 substantially in the horizontal direction as light sources. The outer lens cover 51 is provided with an upper outer lens (outer lens) 51a and a lower outer lens (outer lens) 51b which are exposed to the outside of the rear fender 40 through the upper opening 48a and the lower opening 48b in a state in which the tail lamp unit 50 is mounted to the inside of the rear fender 40, respectively. The upper and lower outer lenses 51a, 51b each are formed into an elongated shape substantially along the horizontal direction as in the case of the upper opening 48a and the lower opening 48b. Here, the outer lens cover 51 is an integrally formed member including the upper and lower outer lenses 51a, 51b with colored (red for example) transparent acryl or the like. A fixing portion 53 is provided for mounting the rear lamp unit 50 to the rear lamp bracket 43.

Figure 5:
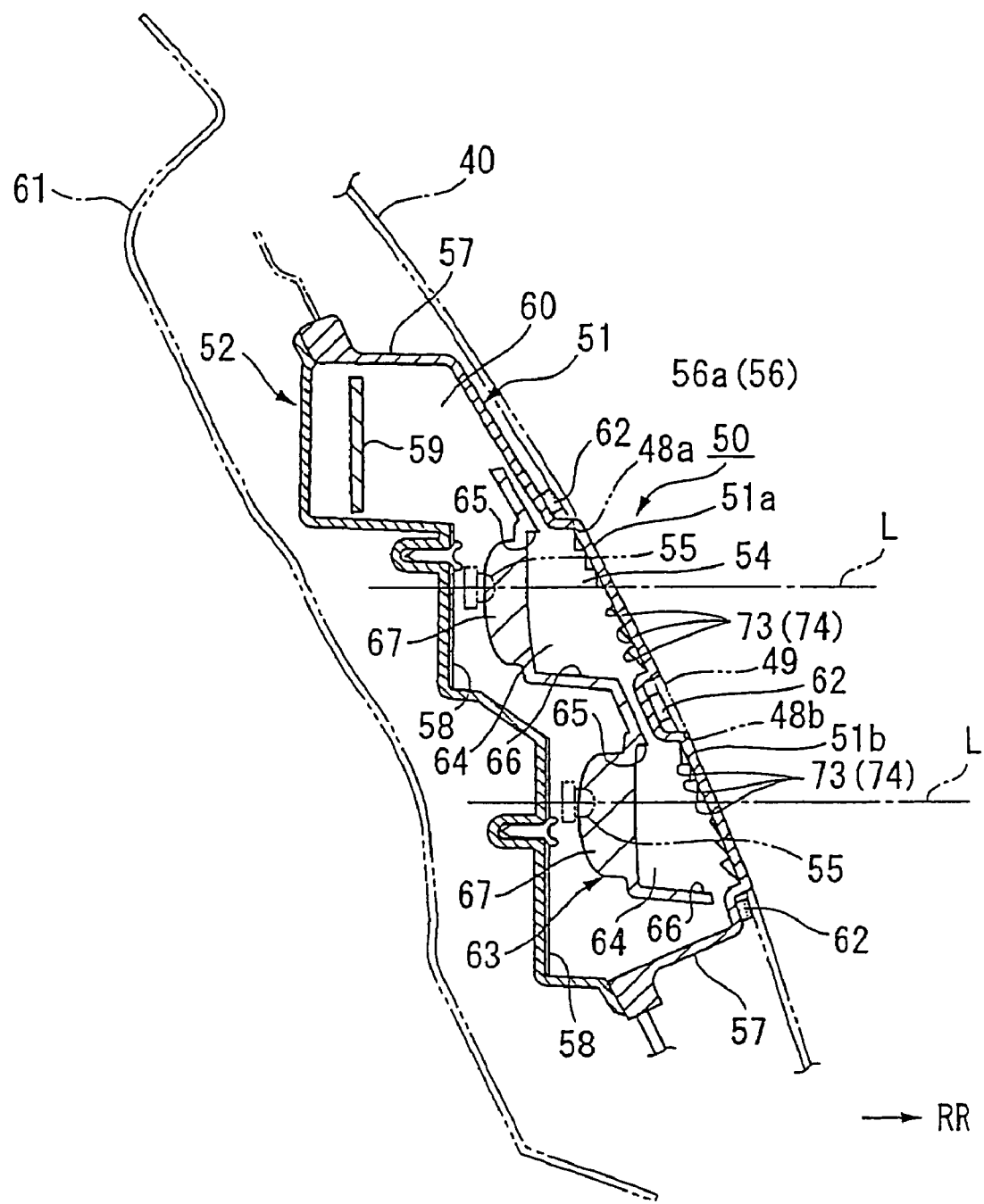
FIG. 5 is a cross-sectional view taken along the line A—A in FIG. 4.
Figure 6:
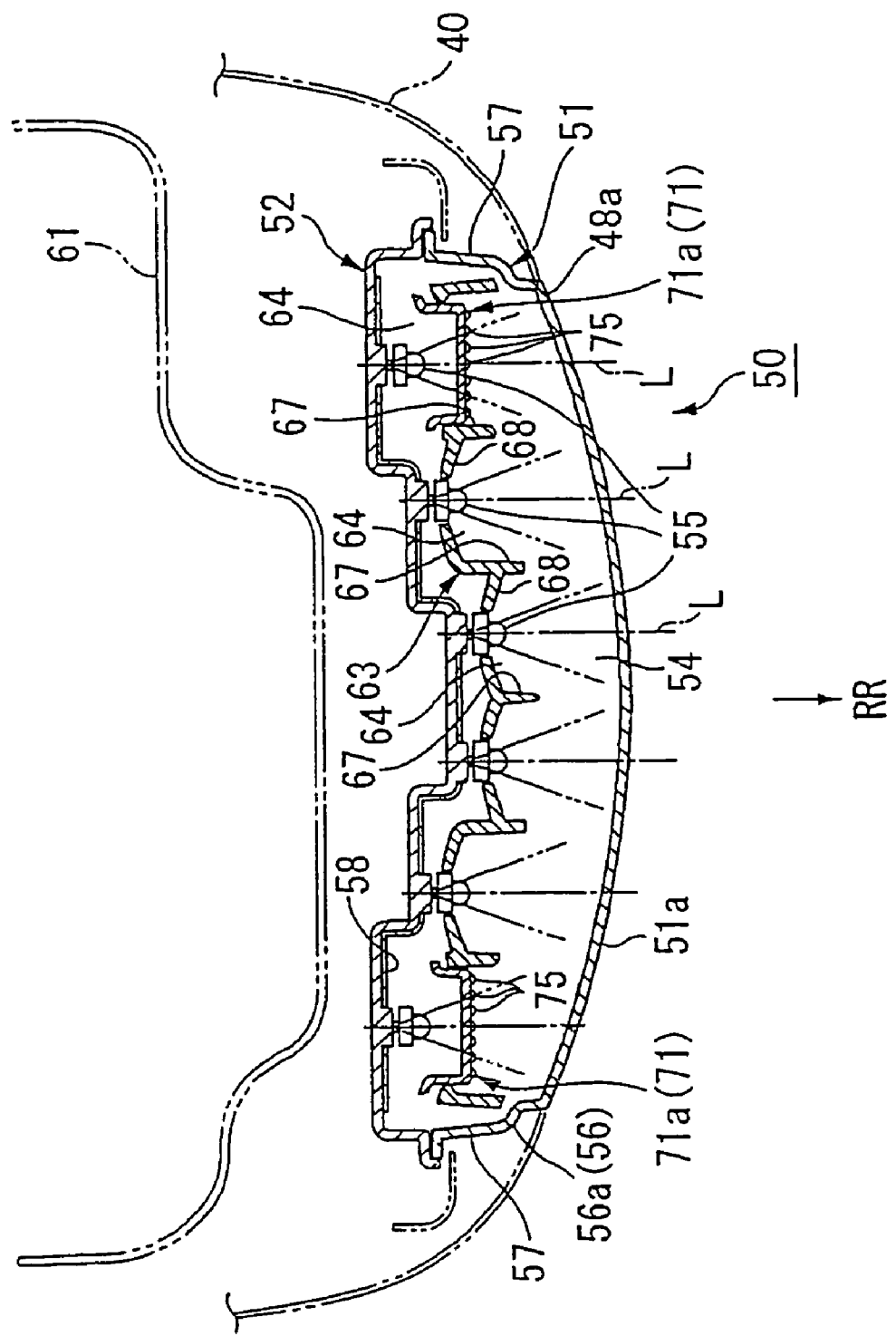
FIG. 6 is a cross-sectional view taken along the line B—B in FIG. 4.

Referring also to FIGS. 5 and 6, the outer lens cover 51 includes a rear face portion 56 formed substantially along the inner surface of the outer peripheral wall 41 of the rear fender 40, and a peripheral walls 57 extending from the peripheral edges of the rear face portion 56 substantially toward the front. The rear face portion 56 is curved to project outwardly of the rear fender 40 according to the shape of the peripheral portion around the lens exposing hole 48 of the outer peripheral wall 41, and is inclined so as to face obliquely upward toward the rear. The upper and lower outer lenses 51a, 51b are provided on the rear face portion 56. The lamp base 52 is provided forwardly of the outer lens cover 51, and the peripheral edge portion of the lamp base 52 and front edge of the peripheral wall 57 of the outer lens cover 51 are joined. FIG. 6 is a cross-sectional view of the upper outer lens 51a. Since the cross-section of the lower outer lens 51b has the same configuration, the description will be made referring to FIG. 6 as a example. The same types of the hatching are used in the respective cross-sections for convenience.

Six light-emitting diodes 55 are provided in the lamp chamber 54 of the rear lamp unit 50 forwardly of the upper and lower outer lenses 51a, 51b. The respective groups of the light-emitting diodes 55 are arranged substantially along the centerlines of the vertical widths of the upper and lower outer lenses 51a, 51b as seen in a rear view of the vehicle body, and are arranged at regular intervals so as to be bilateral symmetry. The respective groups of light-emitting diodes 55 are arranged with the optical axis L thereof extended substantially in the fore-and-aft direction at a substantially constant distance from the upper and lower outer lenses 51a, 51b. In other words, when viewed from the side of the vehicle, the light-emitting diodes 55 are located forwardly of the lower outer lens 51b and are disposed so as to be positioned backwardly of the light-emitting diodes 55 located forwardly of the upper outer lens 51a corresponding to the rear face 56, which is inclined so that the upper side is located in a forward direction. When viewed from the top of the vehicle, the light-emitting diodes 55 at the lateral center are located rearwardly of the light-emitting diodes 55 located on the laterally outsides corresponding to the rear face 56 of an arcuate shape in cross-section.

The respective light-emitting diodes 55 are retained by the lamp base 52 via a power distribution plate 58. Here, the lamp base 52 is formed in a staircase pattern corresponding to the arrangement of the respective light-emitting diodes 55. The outer lens cover 51 and the lamp base 52 extend upwardly of the upper opening 48a, whereby the lamp chamber 54 protrudes upwardly to define a storage space 60 for a base plate 59 for adjusting the applied voltage to the light-emitting diode 55 in the upper portion of the lamp chamber 54. A protective cover 61 for covering the rear lamp unit 50 is provided inside the rear fender 40.

The rear face portion 56 of the outer lens cover 51 is disposed in such a manner that a general surface 56a thereof has a substantially uniform clearance from the inner surface of the outer peripheral wall 41 of the rear fender 40. The upper and lower outer lenses 51a, 51b are formed so as to project rearwardly of the general surface 56a, so that the outer surfaces (light-emitting surfaces) of the upper and lower outer lenses 51a, 51b are substantially flush with the outer surface of the outer peripheral wall 41. A shock absorbing material 62 formed of sponge rubber or the like, which comes into tight contact with the inner surface of the outer peripheral wall 41, is adhered on the general surface 56a including the rear face portion 56 above the upper outer lens 51a, between the upper and lower outer lenses 51a, 51b (the portion facing the dividing beam 49), and below the lower outer lens 51b.

Extensions 63 for defining twelve chambers 64 in total corresponding to the respective light-emitting diode 55 are arranged on the upper and lower levels and are provided in the lamp chamber 54. Each chamber 64 is formed substantially into a rectangular shape when viewed from the rear of the vehicle body and is defined by an upper wall 65, the lower wall 66, and both side walls 67. The light-emitting diode 55 corresponding to this specific chamber 64 is disposed substantially at the center of each chamber 64 when viewed from the rear of the vehicle body. Also, bottom walls 68, which serve as a reflector, are formed substantially into a paraboloid of revolution about the optical axis L of the light-emitting diode 55 and are provided in the respective chambers 64 corresponding to eight light-emitting diodes 55 in total out of the light-emitting diode 55 arranged on the upper and lower levels except for those located at both outer sides. An inner lens cover 71 is attached to the chambers 64 corresponding to the respective light-emitting diodes 55 located on the both outer sides of the upper and lower levels.

Figure 7:
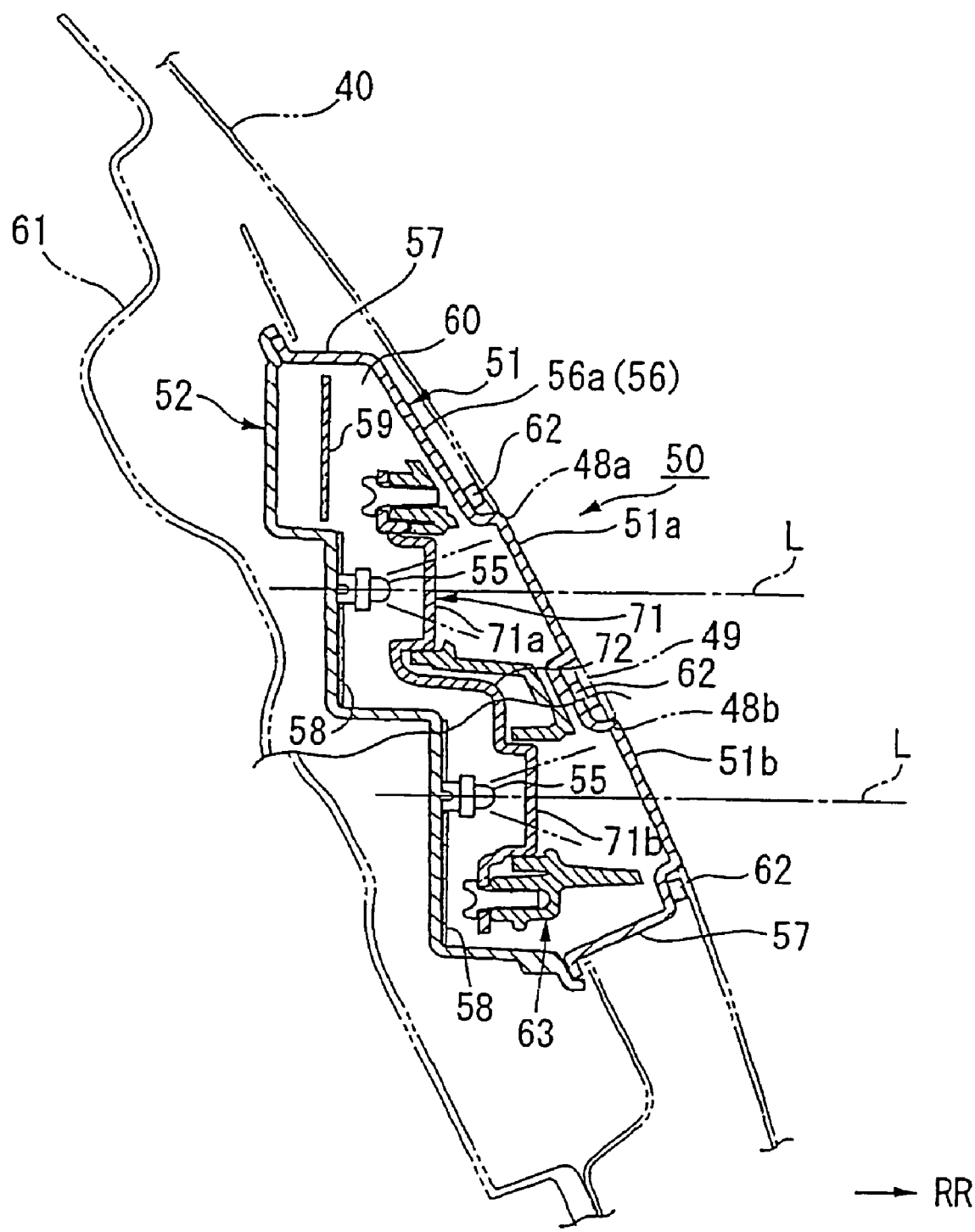
FIG. 7 is a cross-sectional view taken along the line C—C in FIG. 4.

As shown in FIG. 7, the inner lens cover 71 includes an upper inner lens (inner lens) 71a and a lower inner lens (inner lens) 71b positioned forwardly of the light-emitting diodes 55 of the respective chambers 64 of the upper and lower levels formed and connected integrally with each other via a relay portion 72, and is formed substantially into a staircase pattern along the lamp base 52 with a clearance interposed therebetween as needed. The upper and lower inner lenses 71a, 71b are provided between the light-emitting diodes 55 and the upper and lower outer lenses 51a, 51b at the position in the vicinity of the light-emitting diodes 55 in the respective chambers 64 and apart from the upper and lower outer lenses 51a, 51b. The inner lens cover 71 is attached to the extension 63 from the front (from the side of the lamp base 52) and fixed with screws or the like. Here, the inner lens cover 71 is a member including the upper and lower inner lenses 71a, 71b formed of colorless transparent material such as acryl or the like and formed integrally therewith.

As shown in FIG. 4, the upper and lower inner lenses 71a, 71b are formed substantially into a rectangular shape almost overlapped with the both sides of the upper and lower outer lenses 51a, 51b when viewed from the rear of the vehicle body. Then, illumination from the respective light-emitting diodes 55 positioned on both outer sides of the upper and lower levels pass through the upper and lower inner lenses 71a, 71b, then through the both ends of the outer lenses 51a, 51b, and then are emitted to the outside from the lamp chamber 54.

As shown in FIG. 4 and FIG. 5, a cut pattern for forming flute cut lenses (lenses) 73 is provided extending substantially in the horizontal direction between the both side edges on the front face side (the side of the light-emitting diode 55) of the upper and lower outer lenses 51a, 51b. The flute cut lenses 73 form a plurality of triangles substantially in cross section projecting toward the lamp chamber 54, and these flute cut lenses are formed to be vertically symmetry on the respective upper and lower outer lenses 51a, 51b. Ridge lines 74 of the flute cut lenses 73 are formed substantially into a shallow V-shape in the vertical direction corresponding to the upper and lower outer lenses 51a, 51b when viewed from the rear of the vehicle body. In other words, the ridge lines 74 of the flute cut lenses 73 extend substantially in the horizontal direction. The flute cut lenses 73 contribute to diffuse light from the light-emitting diodes 55 substantially in the vertical direction.

As shown in FIG. 6, cut patterns forming vertical flute cut lenses 75 are provided on the rear face side of the upper and lower inner lenses 71a, 71b (on the side of the outer lenses 51a, 51b) so as to extend substantially in the vertical direction between the upper edges and the lower edges thereof. More specifically, the vertical flute cut lenses 75 are formed so as to extend, when viewed from the rear of the vehicle body, in the direction substantially orthogonal to the ridges 74 of the flute cut lenses 73 formed on the portion of the outer lenses 51a, 51b superimposed with the upper and lower inner lenses 71a, 71b when viewed from the rear of the vehicle body. The illumination from the light-emitting diodes 55 is diffused substantially in the lateral direction by the vertical flute cut lenses 75. A spiral cut pattern about the optical axis L is provided on the front face sides (the side of the light-emitting diode 55) of the upper and lower inner lenses 71a, 71b for diffusing illumination from the light-emitting diodes 55 as needed.

According to the aforementioned embodiment, in the rear lamp unit 50 which functions as a tail lamp and a brake lamp for the motorcycle 1 and is illuminated by illumination from the plurality of light-emitting diodes 55, since the upper and lower inner lenses 71a, 71b are provided between the light-emitting diodes 55 located at both outer sides and the both sides of the respective outer lenses 51a, 51b, respectively, illumination from the light-emitting diodes 55 at both outer sides passes through the corresponding upper and lower inner lenses 71a, 71b, then passes through the outer lenses 51a, 51b, and then is emitted outside. In this case, illumination from the light-emitting diode 55 is diffused substantially in the lateral direction by the lens cut pattern of the upper and lower inner lenses 71a, 71b and is substantially in the vertical direction by the lens cut pattern of the outer lenses 51a, 51b.

Since the ridges 74 of the flute cut lenses 73 are formed on the outer lenses 51a, 51b and can be seen from the outside the outer lens cover 51, the cut pattern of the outer lenses 51a, 51b extending substantially in the horizontal direction is employed in relation to the appearance of the motorcycle 1. However, in such a case as well, light from the light-emitting diode 55 having high directivity can be diffused in the vertical and lateral directions to increase the light-emitting areas at the both side portions of the outer lenses 51a, 51b. Therefore, light emission from the rear lamp unit 50 itself can be easily recognized easily viewed obliquely from the rear of the motorcycle. Thus, visibility of the tail lamp and the brake lamp may be improved and the flexibility in modeling of the rear lamp unit 50 itself and in the design of the vehicle body therearound may be improved.

Also, since the inner lenses 71a, 71b are provided in the vicinity of the light-emitting diodes 55 at locations apart from the outer lenses 51a, 51b, the inner lenses 71a, 71b can hardly be seen from the outside. Thus, a good appearance of the vehicle can be maintained.

In addition, since the outer lenses 51a, 51b are red transparent lenses, the inner lenses 71a, 71b can hardly be seen from the outside in comparison with the case in which they are colorless transparent lenses. Thus, a good appearance of the vehicle is maintained. Furthermore, when the inner lenses 71a, 71b are colorless transparent members, a lowering of the amount of illumination from the light-emitting diode 55 may be prevented in comparison with the case in which they are colored transparent lenses, whereby visibility of the tail lamp, the brake lamp, and so on can be maintained preferably.

In particular, even when the light-emitting surfaces of the outer lenses 51a, 51b are curved so as to be flush with the outer surface of the outer peripheral wall 41 of the rear fender 40, light emission from the rear lamp unit 50 itself can easily be recognized when viewing the motorcycle 1 obliquely from the rear thereof. Also, in comparison with the case in which the inner lens is provided between all of the light-emitting diodes 55 and the outer lenses 51a, 51b, the size of the inner lens and the number of component may be reduced. Thus, a weight reduction and a cost reduction of the rear lamp unit 50 itself is achieved.

Figure 8:
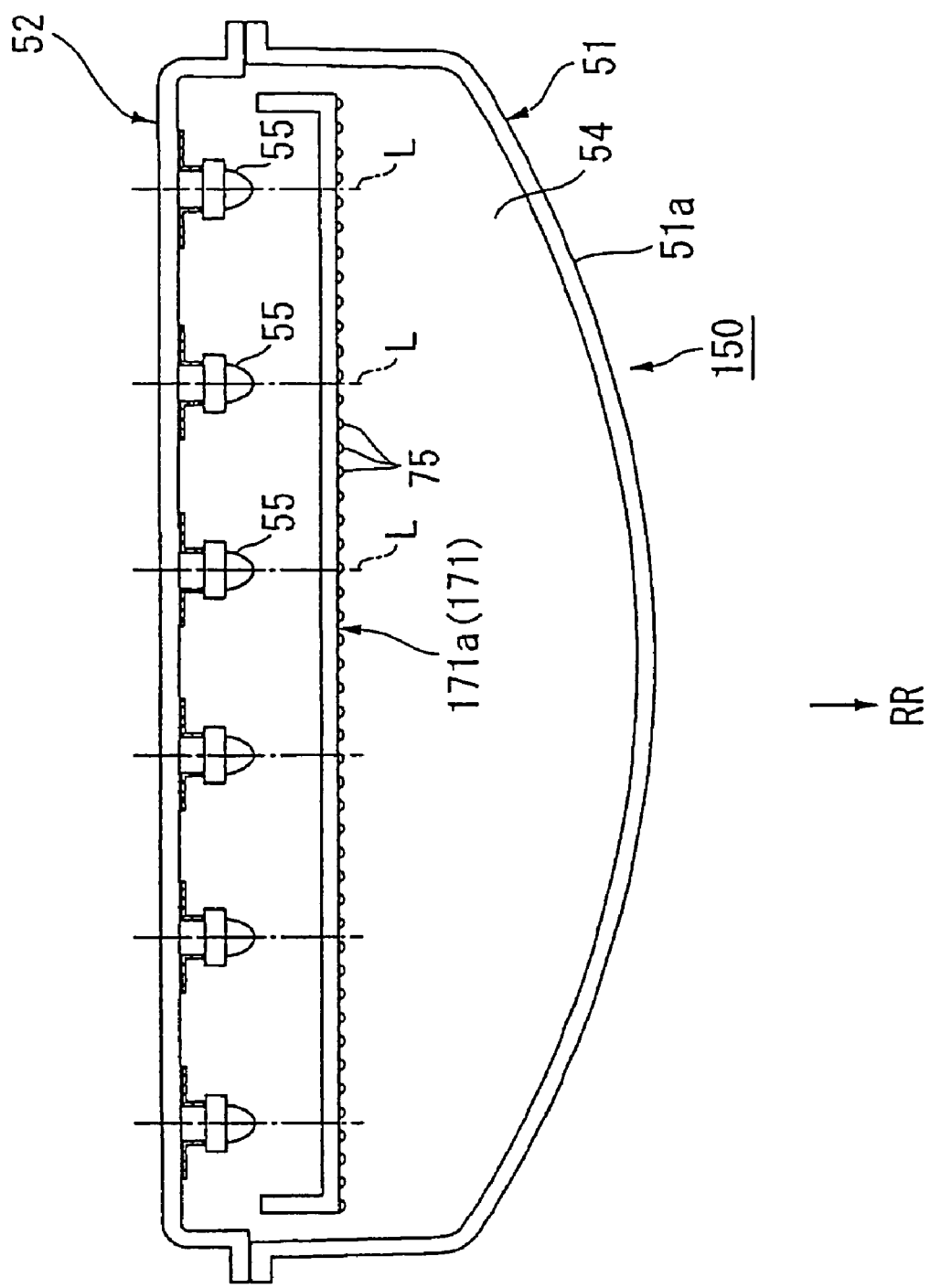
FIG. 8 is a cross-sectional view of a modification of the rear lamp unit corresponding to FIG. 6.

The invention is not limited to the above-described embodiment. For example, a rear lamp unit 150 shown in FIG. 8 may be used wherein an inner lens cover 171 is mounted so as to cover all of the light-emitting diodes 55 arranged in the lamp chamber 54 from the illuminating direction (from the rear of the vehicle) so that an inner lens 171 a is provided between all the light-emitting diodes 55 and the outer lenses 51a, 51b. Lenses formed on the outer lenses 51a, 51b and the inner lenses 71a, 71b may be cylindrical lenses. Further, for example, the cut pattern extending substantially in the vertical direction may be employed for the outer lenses 51a, 51b, and the cut pattern extending substantially in the horizontal direction may be employed for the inner lenses 71a, 71b. Furthermore, the rear lamp unit having a structure in which the light-emitting diodes 55 may be differentiated for the tail lamp and for the brake lamp, or the structure in which the rear winkers 37 or the back lamp are included may also be applicable. The structure of the aforementioned embodiment is only an example, and modifications may be made as needed without departing the scope of the invention as a matter of course.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear lamp unit for a vehicle comprising:
an outer lens for guiding light emitted from a light-emitting diode to the outside the vehicle; and
an inner lens is provided between said light-emitting diode and the outer lens;
wherein the inner lens is provided at a location apart from said outer lens,
wherein said outer lens has cuts extending in substantially a first direction and said inner lens has cuts extending in a second direction substantially orthogonal to the cuts of said outer lens,
wherein the inner lens is arranged in relation to the outer lens such that light emitted from the light-emitting diode passes through the inner lens and is diffused in the second direction and then passes through the outer lens and is diffused in the first direction,
wherein the light-emitting diode includes a plurality of light-emitting diodes, and
wherein the inner lens are provided only on outside light emitting diodes.

2. The rear lamp unit for a vehicle according to claim 1, wherein the cuts of said outer lens extends substantially in the horizontal direction and the cuts of said inner lens extends substantially in the perpendicular direction.

3. The rear lamp unit for a vehicle according to claim 2, wherein a plurality of said light-emitting diodes are arranged substantially in a horizontal direction and said inner lens is provided between the light-emitting diodes and the outer lens.

4. The rear lamp unit for a vehicle according to claim 2, wherein said outer lens is a colored transparent member and the inner lens is a colorless transparent member and said inner lens is disposed in the vicinity of said light-emitting diodes.

5. The rear lamp unit for a vehicle according to claim 1, wherein a plurality of said light-emitting diodes are arranged substantially in a horizontal direction and said inner lens is provided between the light-emitting diodes and the outer lens.

6. The rear lamp unit for a vehicle according to claim 1, wherein said outer lens is a colored transparent member and the inner lens is a colorless transparent member and said inner lens is disposed in the vicinity of said light-emitting diodes.

7. A rear lamp unit for a vehicle which is illuminated by light emitted from the light-emitting diode comprising:
an inner lens and an outer lens are disposed in the illuminating direction of said light-emitting diode,
wherein said outer lens has cuts extending in substantially a first direction and said inner lens has cuts extending in a second direction substantially orthogonal to the cuts of said outer lens,
wherein the inner lens is arranged in relation to the outer lens such that light emitted from the light-emitting diode passes through the inner lens and is diffused in the second direction and then passes through the outer lens and is diffused in the first directions,
wherein the light-emitting diode includes a plurality of light-emitting diodes, and
wherein the inner lens are provided only on outside light emitting diodes.

8. The rear lamp unit for a vehicle according to claim 7, wherein the cuts of said outer lens extends substantially in the horizontal direction and the cuts of said inner lens extends substantially in the perpendicular direction.

9. The rear lamp unit for a vehicle according to claim 8, wherein a plurality of said light-emitting diodes are arranged substantially in the horizontal direction, and said inner lens is provided between the light-emitting diodes and the outer lens.

10. The rear lamp unit for a vehicle according to claim 8, wherein said outer lens is a colored transparent member and the inner lens is a colorless transparent member and in that said inner lens is disposed in the vicinity of said light-emitting diodes.

11. The rear lamp unit for a vehicle according to claim 7, wherein a plurality of said light-emitting diodes are arranged substantially in a horizontal direction and said inner lens is provided between the light-emitting diodes and the outer lens.

12. The rear lamp unit for a vehicle according to claim 7, wherein said outer lens is a colored transparent member and the inner lens is a colorless transparent member and said inner lens is disposed in the vicinity of said light-emitting diodes.

13. A rear lamp unit for a vehicle comprising:
a lamp base for mounting at least one illuminating means;
an inner lens mounted adjacent to said lamp base for enabling light emitted from the at least one illuminating means to be transmitted therethrough;
an outer lens mounted adjacent to said lamp base with said inner lens being disposed between said lamp base and said outer lens, said outer lens permits light emitted from the at least one illuminating means to be transmitted outside the vehicle; and
wherein the inner lens is provided at a location apart from said outer lens,
wherein said outer lens has cuts extending in substantially a first direction and said inner lens has cuts extending in a second direction substantially orthogonal to the cuts of said outer lens,
wherein the inner lens is arranged in relation to the outer lens such that light emitted from the light-emitting diode passes through the inner lens and is diffused in the second direction and then passes through the outer lens and is diffused in the first directions,
wherein the at least one illuminating means includes a plurality of light-emitting diodes, and
wherein the inner lens are provided only on outside light emitting diodes.

14. The rear lamp unit for a vehicle according to claim 13, wherein the cuts of said outer lens extends substantially in the horizontal direction and the cuts of said inner lens extends substantially in the perpendicular direction.

15. The rear lamp unit for a vehicle according to claim 13, wherein a plurality of said illuminating means includes light-emitting diodes which are arranged substantially in a horizontal direction and said inner lens is provided between the light-emitting diodes and the outer lens.

16. The rear lamp unit for a vehicle according to claim 15, wherein a plurality of said light-emitting diodes are arranged substantially in the horizontal direction, and said inner lens is provided between the light-emitting diodes and the outer lens.

17. The rear lamp unit for a vehicle according to claim 13, wherein said outer lens is a colored transparent member and the inner lens is a colorless transparent member and said inner lens is disposed in the vicinity of said illuminating means.

* * * * *